US012636993B2

(12) United States Patent
Chen et al.

(10) Patent No.: US 12,636,993 B2
(45) Date of Patent: May 26, 2026

(54) VEHICLES FOR PACKAGE DELIVERY, SYSTEMS FOR SAME, AND ASSOCIATED METHODS

(71) Applicant: Ford Global Technologies, LLC, Dearborn, MI (US)

(72) Inventors: Yifan Chen, Ann Arbor, MI (US); John Randolf Vincent, Livonia, MI (US); Geoffrey Horowitz, Birmingham, MI (US); Kurt Michael Lundeen, Novi, MI (US); Sarah Garrow, Coral Gables, FL (US); Sam Hoff, Hazel Park, MI (US)

( * ) Notice: Subject to any disclaimer, the term of this patent is extended or adjusted under 35 U.S.C. 154(b) by 546 days.

(21) Appl. No.: 18/333,105

(22) Filed: Jun. 12, 2023

(65) Prior Publication Data

US 2024/0409018 A1    Dec. 12, 2024

(51) Int. Cl.
*B60P 1/64* (2006.01)
*G06Q 10/083* (2024.01)

(52) U.S. Cl.
CPC ........... *B60P 1/6481* (2013.01); *B60P 1/6427* (2013.01); *B60P 1/6436* (2013.01); *G06Q 10/08355* (2013.01)

(58) Field of Classification Search
CPC ..... B60P 1/6481; B60P 1/6427; B60P 1/6436; G06Q 10/08355; G06Q 10/08; B62D 25/2054
See application file for complete search history.

(56) References Cited

U.S. PATENT DOCUMENTS

| | | | |
|---|---|---|---|
| 8,615,473 B2 | 12/2013 | Spiegel et al. | |
| 10,464,106 B1 * | 11/2019 | Mo ........................ | B65G 67/20 |
| 10,775,182 B2 | 9/2020 | Fu et al. | |
| 11,113,661 B2 | 9/2021 | Rahilly et al. | |

(Continued)

FOREIGN PATENT DOCUMENTS

| | | | | |
|---|---|---|---|---|
| DE | 112022004386 T5 * | 6/2024 | ............... | B60P 7/00 |
| WO | WO-2023205436 A2 * | 10/2023 | ............... | B65G 7/20 |

OTHER PUBLICATIONS

DE_112022004386 with EN (Year: 2024).*
Shipsy, Seamless On Demand Delivery Management Platform, May 20, 2022.

*Primary Examiner* — Jacob S. Scott
*Assistant Examiner* — Erin Morris
(74) *Attorney, Agent, or Firm* — Emily Campbell; Eversheds Sutherland (US) LLP

(57) ABSTRACT

A vehicle for package delivery is provided. The vehicle includes one or more processors; a tile floor system connected to the one or more processors, the tile floor system comprising a plurality of tiles with actuators that individually move containers thereon, and in a first arrangement a first tile is associated with a first container; at least one imaging device; and a memory. The processors determine an identifier for a package, receive first image data associated with the package from the imaging device, determine a first association of the package with the first container based on the first image data, determine a first delivery route that includes a first stop associated with the identifier for the package, and rearrange the containers by the tile floor system into a second arrangement based on the first delivery route prior to the first stop of the first delivery route.

20 Claims, 12 Drawing Sheets

(56)          References Cited

U.S. PATENT DOCUMENTS

| | | | |
|---|---|---|---|
| 11,741,422 B2 * | 8/2023 | Gil .................... | G06Q 10/08355 |
| | | | 705/338 |
| 12,258,216 B2 * | 3/2025 | Kalouche ............. | B65G 1/0485 |
| 2016/0328669 A1 | 11/2016 | Droege | |
| 2019/0168392 A1 * | 6/2019 | Väin ........................ | G06Q 10/00 |
| 2020/0175471 A1 * | 6/2020 | Tsuruta ............. | G06Q 10/0838 |
| 2021/0256472 A1 * | 8/2021 | Javidan ................. | H04W 4/025 |
| 2022/0297939 A1 * | 9/2022 | Chen .................... | B60P 1/6436 |
| 2024/0420076 A1 * | 12/2024 | Nakanishi ........ | G06Q 10/08355 |

* cited by examiner 100
200
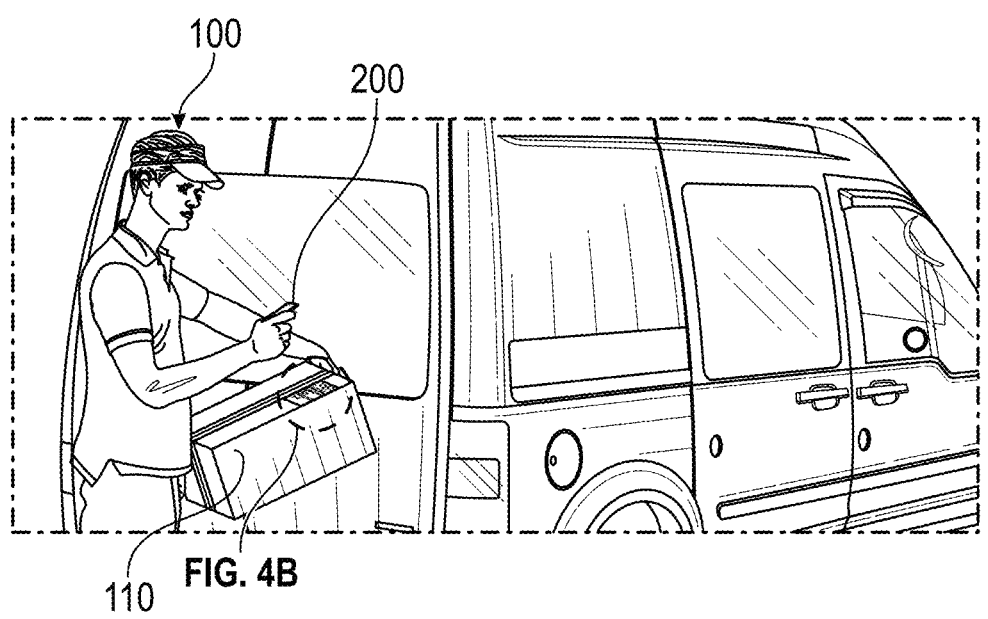
110
FIG. 4B
FIG. 4A
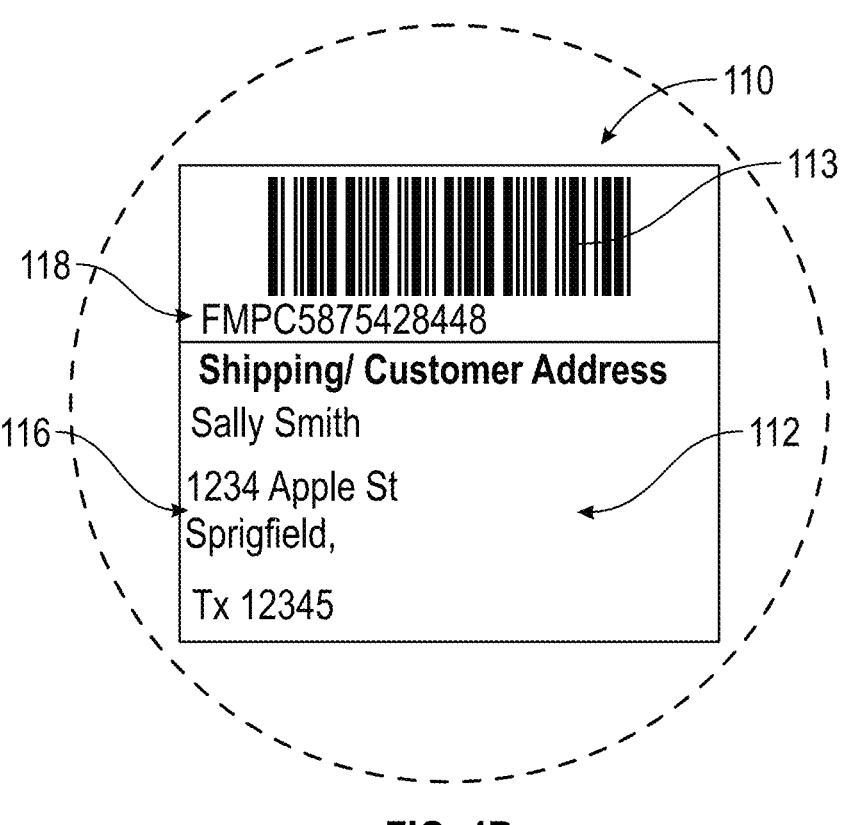
110
113
118
FMPC5875428448
Shipping/ Customer Address
Sally Smith
116
1234 Apple St
Sprigfield,
Tx 12345
112
FIG. 4B

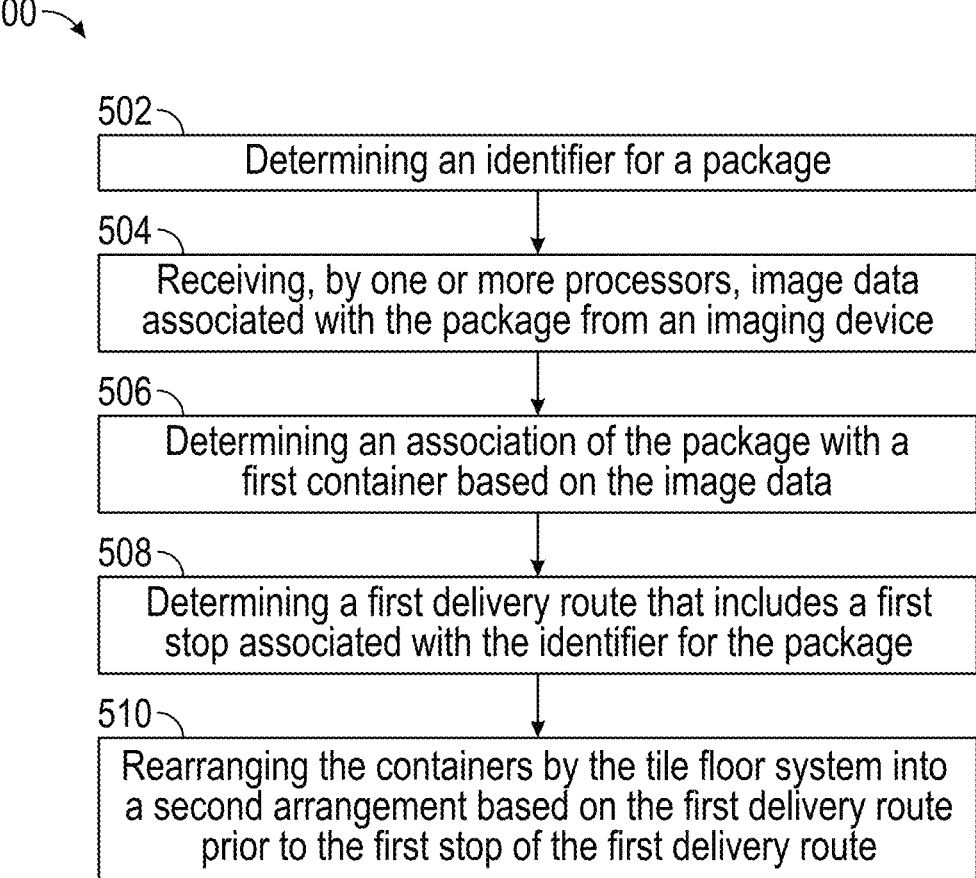

500

502
Determining an identifier for a package

504
Receiving, by one or more processors, image data associated with the package from an imaging device 506
Determining an association of the package with a first container based on the image data 508
Determining a first delivery route that includes a first stop associated with the identifier for the package 510
Rearranging the containers by the tile floor system into a second arrangement based on the first delivery route prior to the first stop of the first delivery route

VEHICLES FOR PACKAGE DELIVERY, SYSTEMS FOR SAME, AND ASSOCIATED METHODS

BACKGROUND

In 2021, e-commerce sales experienced growth of over 14% in the United States to $870 billion. This number is expected to continue its double-digit growth in the foreseeable future. When it comes to e-commerce, delivery of goods depends in large part on efficiency. While large companies such as Amazon, Walmart, and UPS invest billions of dollars in technology, data analytics, and infrastructure to be competitive, small and medium businesses often struggle due to lack of scale and investment.

Additionally, mail order delivery and grocery delivery have become a fast-growing trend, along with restaurant food delivery. In this environment, goods are typically shipped from local stores to neighborhood residents. The orders often come in on-the-fly, and are thus hard to predict, in terms of planning for delivery. Furthermore, drivers are part-time gig workers who drive their personal vehicles for delivery, such that route plans are often not optimized.

It is with respect to these and other considerations that the instant disclosure is concerned.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4A shows a delivery driver holding a package near the vehicle of FIGS. 1 and 2.

FIG. 4B shows an enlarged view of a portion of the package depicted in FIG. 4A.

FIG. 7 is a flow chart corresponding to an example method in which the disclosed concept may be employed.

DETAILED DESCRIPTION

Overview

Figure 1:
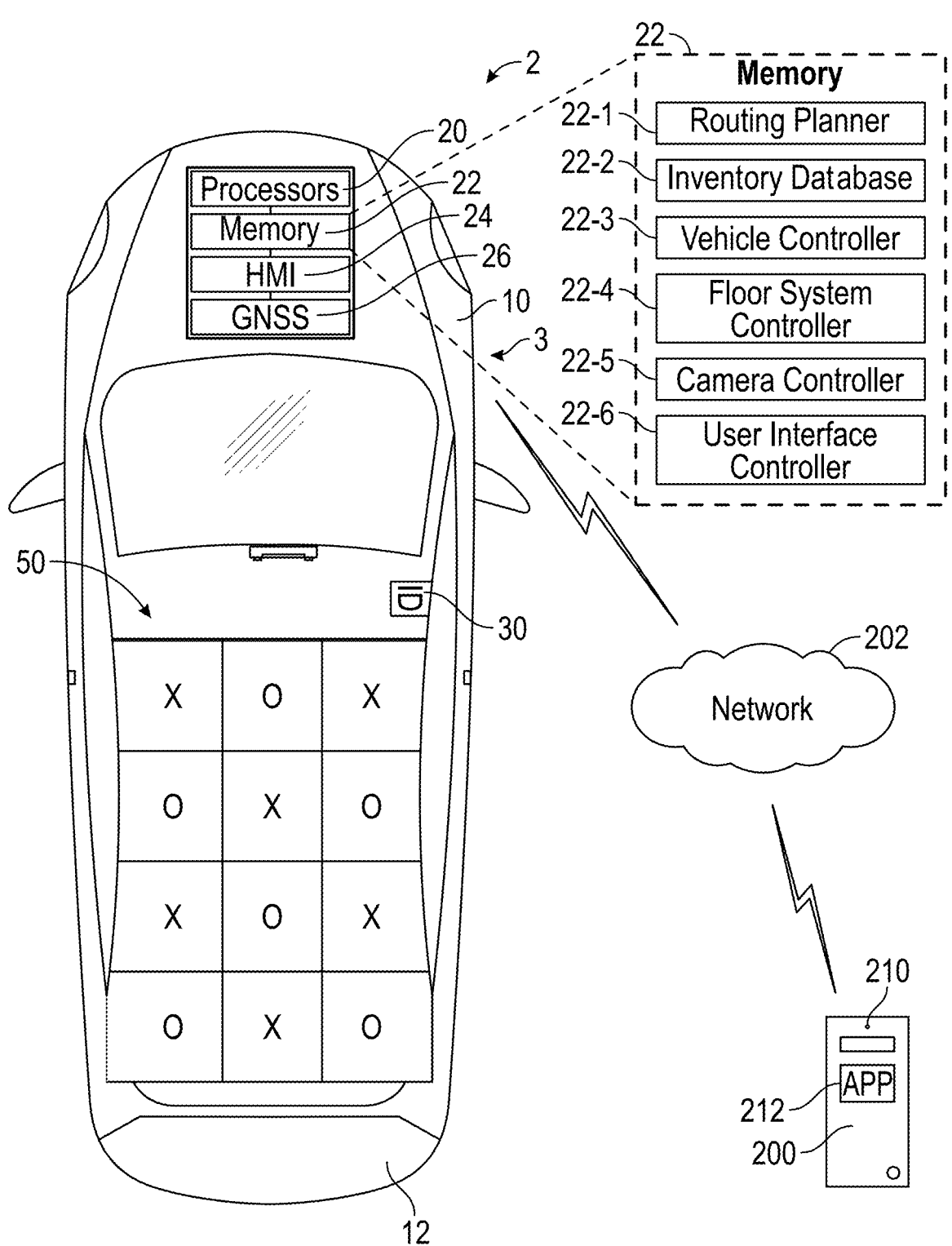
FIG. 1 is a simplified view of a vehicle and package delivery system for the same, shown connected to a mobile device via a network, in accordance with one non-limiting embodiment of the disclosed concept.

The vehicle, systems, and methods disclosed herein assist at least in part in allowing packages to be delivered in a more efficient and automated manner. In order to do this, the vehicle preferably includes one or more processors; a tile floor system connected to the one or more processors, the tile floor system comprising a plurality of tiles with actuators that individually move containers thereon, and in a first arrangement a first tile is associated with a first container; at least one imaging device, and a memory. The processors determine an identifier for a package, receive first image data associated with the package from the imaging device, determine a first association of the package with the first container based on the first image data, determine a first delivery route that includes a first stop associated with the identifier for the package, and automatically rearrange the containers by the tile floor system into a second arrangement based on the first delivery route prior to the first stop of the first delivery route. In accordance with the disclosed concept, there may be a plurality of containers associated with the tiles, such that the individual tiles cause the containers to move to desired positions (e.g., immediately adjacent doors of the vehicle).

Additionally, the memory may include instructions that cause the processors to determine an identifier (e.g., a delivery address) for a package, receive first image data of the package from the imaging device, determine a first association of the package with a first container based on the first image data, determine a first delivery route that includes a first stop associated with the identifier for the package, and rearrange the containers using the tile floor system into a first arrangement based on the first delivery route prior to the first stop of the first delivery route.

In operation, this may begin with a delivery driver scanning a plurality of packages with a mobile device and placing the packages into containers that are located on the tile floor system. When this is done, data may be sent via a mobile application of the mobile device to the processors of the vehicle or to a cloud. This data may correspond to both addresses associated with the packages and a container in which one or more of the packages may be located. Furthermore, the containers may have unique identification numbers that allow them to be associated with the packages. For example, a camera associated with the delivery vehicle, such as being mounted there with a field of view that includes where the containers are being loaded, may receive data corresponding to which of the containers the limbs of the delivery driver are being directed towards, thus allowing for an accurate determination of which specific container each package is in.

Subsequently, once packages (e.g., one or more) have been loaded into the containers, the processors of the vehicle cause the tiles of the tile floor system to automatically rearrange the containers, and may provide the delivery driver with a preferred driving route, for example, via a human to machine interface of the vehicle and/or via the mobile device of the delivery driver. The delivery driver can thus follow the driving route, which may be provided by a global navigation satellite system (GNSS) of the vehicle, to a first stop. As the driver is driving to the first stop, the tile floor system may rearrange the containers so that a predetermined package or packages associated with the first stop may be located in a container that has been moved to a predetermined position, which may be a position immediately adjacent a door (e.g., a rear access door) of the vehicle making it easy for the driver to access the package(s) for delivery.

Once the driver arrives at a given delivery stop, he or she can simply open the door of the vehicle, remove the readily accessible package, deliver it to the addressee, and resume driving. As the delivery driver is delivering the package at the first stop, the GNSS will provide the delivery driver with a driving route to a second stop and will in turn cause the tile floor system to automatically move the containers into a second arrangement. The second arrangement may correspond to another container with another package or packages having been moved to a predetermined position immediately adjacent the rear access door. That is, the container with other package(s) will automatically be moved, in concert with other containers as needed, by the tile floor system to move from a first position to a target (e.g., easy to access) position. Accordingly, the delivery driver can simply follow the driving route to a second stop, remove the other package or packages that are located in a position readily accessible at a door or window (or other designated portal for access to the container(s) of interest) of the delivery vehicle, such as a door at the rear of the vehicle, deliver the packages, and continue driving.

The disclosed vehicle and system for the same is thus automated in a manner that removes significant amounts of manual labor, which prior art systems undesirably require. For example, delivery drivers employing the disclosed vehicle and systems generally do not have to be concerned about in what order the packages should be loaded into the vehicle. The system automatically re-orients the containers with the packages so the container(s) with the package(s) for delivery at each stop is easily accessible by the driver, and tells the delivery driver where to drive. It does this by establishing several associations among the packages, the containers, and delivery stops on the route plan. A first association can be established between the packages and the delivery stops on the routine plan based on the addresses of the packages. A second association can be established between the packages and the containers based on the data obtained/received from a camera associated with the delivery vehicle, such as being mounted there with a field of view that includes which of the containers the limbs of the delivery driver are being directed towards, thus allowing for an accurate determination of which specific container each package is in. Based on the two associations, the system may determine which container needs to be moved to the target (e.g., easy to access) position for the upcoming delivery stop.

Furthermore, if the delivery driver deviates from a given driving route, the system will automatically re-configure the containers using the tile floor system for the new next stop according to a new driving route and next delivery stop. This is advantageous for situations where the delivery driver may take a lunch break and/or where the delivery driver may be provided with packages, such as groceries, that must be delivered quicker than other packages.

By automatically moving a package or packages to a predetermined target (e.g., easy to access) position at the right time in accordance with the delivery route plan, the system allows the driver to deliver a package or packages more quickly at each delivery stop. Further, by eliminating the need for the driver to manually search and fetch the right package or packages inside the vehicle for each delivery stop, it reduces the opportunity for human errors (e.g., dropping off a wrong package) during the delivery process. Finally, with this system, driver can focus on driving, and not planning on the next stop.

These and other advantages of the present disclosure are provided in greater detail herein.

ILLUSTRATIVE EMBODIMENTS

As employed herein, the term "coupled" shall mean connected together either directly or via one or more intermediate parts or components.

FIG. 1 is a simplified view of a vehicle 2 and package delivery system 3 for the same, shown wirelessly connected to a mobile device 200 via network 202, in accordance with one non-limiting embodiment of the disclosed concept. The mobile device 200, which may be a mobile phone, may have a camera or other imaging device (e.g., barcode reader or the like) 210 and a mobile application 212 that are together configured to assist with package delivery, as will be discussed below.

The vehicle 2 includes a body or frame 10, a door (e.g., rear access door 12) coupled to the frame 10 and configured to open and close with respect to the body 10, one or more processors 20, a memory 22, a human to machine interface (HMI) 24 electrically connected to the processors 20, a global navigation satellite system (GNSS) 26 electrically connected to the processors 20, and at least one imaging device 30. The memory 22 may include a routing planner 22-1, an inventory database 22-2, a vehicle controller 22-3, a floor system controller 22-4, a camera controller 22-5, and a user interface controller 22-6. The routing planner 22-1 is configured to geocode addresses and determine a preferred delivery route based on inventory as determined by the inventory database 22-2. The inventory database 22-2 is configured to maintain the system of packages, associated containers, and delivery addresses. The vehicle controller 22-3 manages the movement of containers, including container requests and sorting algorithms. The floor system controller 22-4 is configured to receive data from other modules of the memory 22. The camera controller 22-5 is configured for processing images for determining which container a given package is placed in, as will be discussed below. The user interface controller 22-6 includes both the driver interface application and the driver navigation overlays.

The imaging device 30 may be electrically connected to the processors 20, coupled to the body 10, and configured to scan an interior of the vehicle 2. Moreover, the package delivery system 3 can generally be stated as including the processors 20 and the memory 22, and the software stored thereon for implementing the operations described herein. More specifically, and as will be discussed in greater detail below, the vehicle 2 and associated system 3 advantageously allows packages to be delivered with greater ease to drivers, saving them and their companies time and money.

Figure 2:
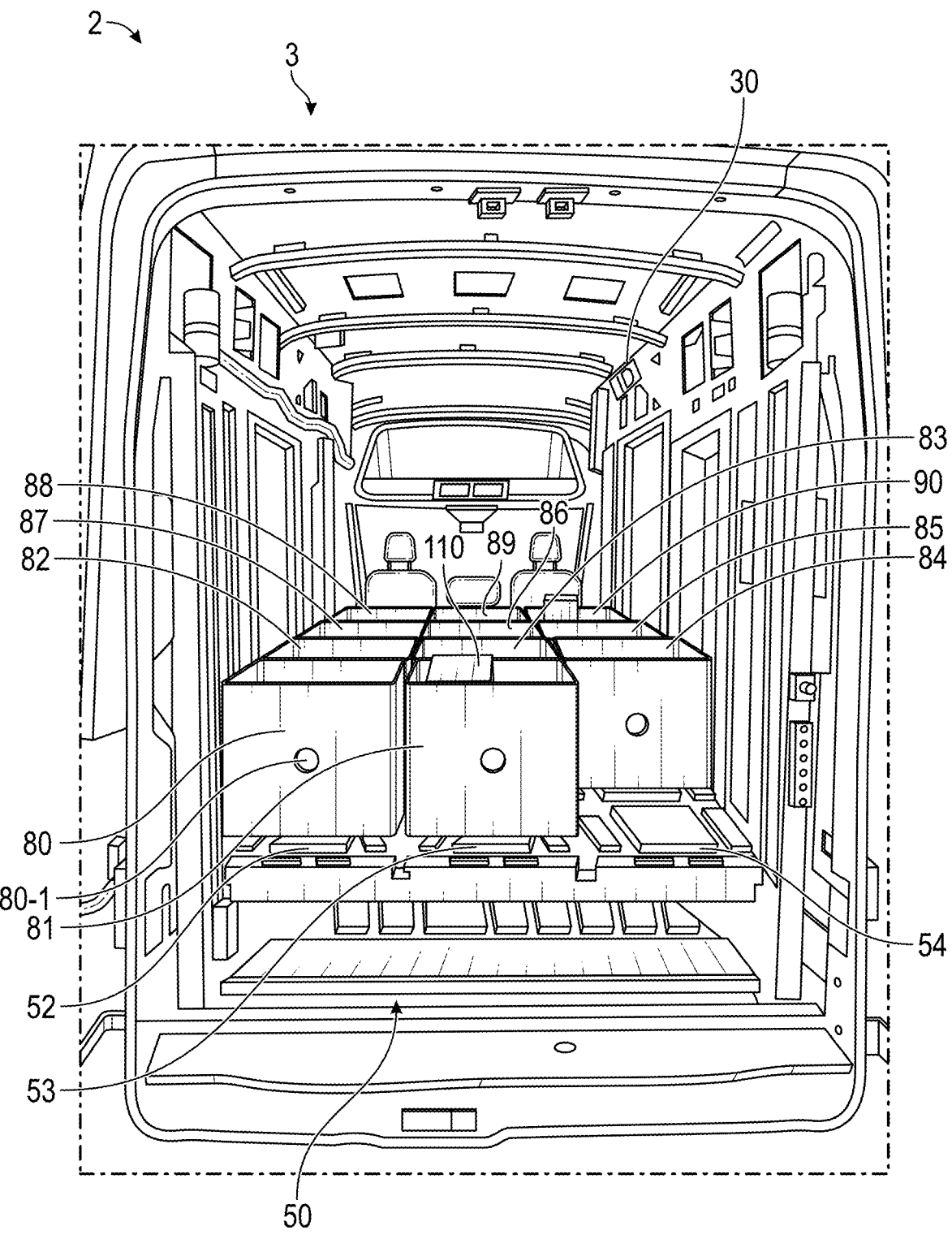
FIG. 2 is a rear view of the vehicle and package delivery system of FIG. 1, shown with access doors of the vehicle removed in order to see hidden structures.
Figure 3:
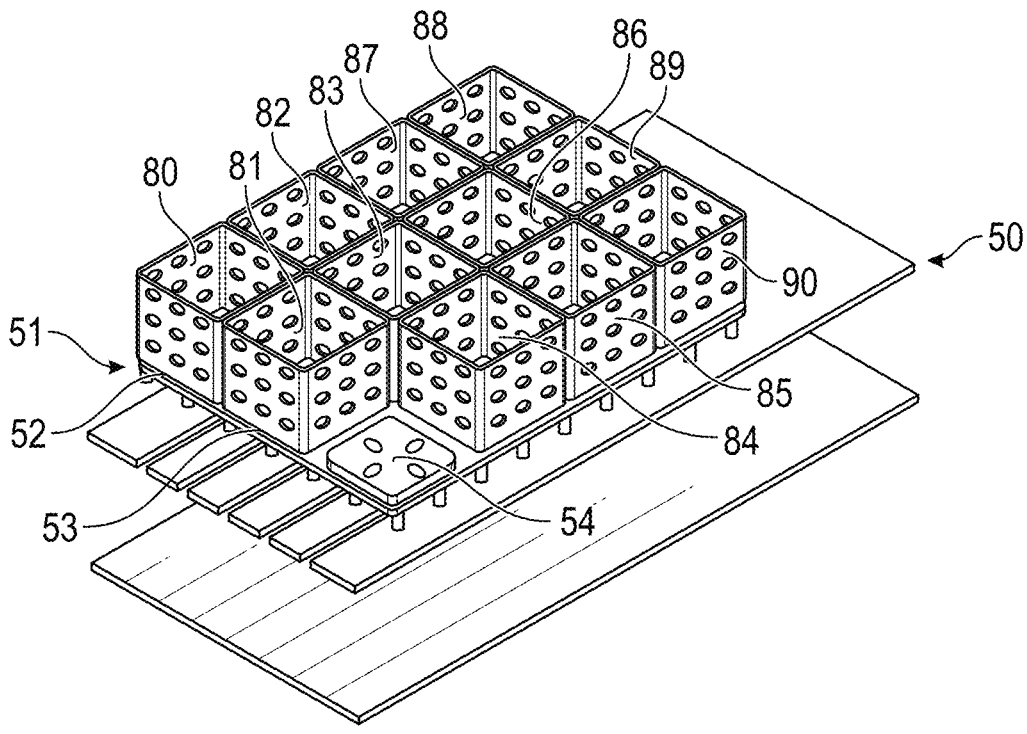
FIG. 3 is an exploded isometric view of a portion of a tile floor system for the vehicle of FIGS. 1 and 2, shown with a plurality of containers.

FIG. 2 shows a rear view of an interior of the vehicle 2, and FIG. 3 shows an exploded isometric view of a portion of the tile floor system 50 with a plurality of containers 80-90 located on the tile floor system 50. The tile floor system 50 has a plurality of tiles (only three tiles 52,53,54 of the twelve total tiles are labeled) that have actuators in them to individually move containers thereabout via smart algorithms. Hereinafter the twelve tiles including 52,53,54 will be referred to as the tiles 51. Furthermore, in the example shown, the containers 80-90 total eleven in number, and the eleven containers 80-90 are each configured to be associated with eleven of the twelve total tiles (the tiles 51).

In operation, the tile floor system 50 functions to move each of the eleven individual containers 80-90 using the tiles 51 into various arrangements within the interior of the vehicle 2. For example, FIG. 3 provides for eleven containers 80-90, and one tile 54 that does not have a container associated with or located on it. Furthermore, the tile floor system 50 may have a processor, a memory, and motorized rollers that selectively rotate to move the containers 80-90 so that any of the eleven containers 80-90 can move to predetermined positions (e.g., proximate the rear access door 12 for delivery). For example, rollers of the respective tiles may move the containers in 2 or more directions, such as corner tiles may be able to move a container therein in 2 directions, wherein along the edges (e.g., sides) may be able to move a container in 3 directions, and tiles in the middle may be able to move containers in 4 directions. See, for example, U.S. Pat. No. 10,988,069 and pending patent application Ser. No. 17/818,815. Additionally, the processor of the tile floor system 50 may be electrically connected to the other processors 20 of the vehicle 2.

In accordance with the disclosed concept, the memory 22 (FIG. 1) may include instructions that, when executed by the processors 20, cause the processors 20 to perform operations including determining an identifier for a package, receiving first image data of the package from an image device (e.g., the image device 30 or the mobile device 200), determining a first association of the package with one of the containers 80-90 based on the first image data, determining a first delivery route that includes a first stop associated with the identifier for the package, and therefore the container that contains the package, and rearranging the containers 80-90 via the tile floor system 50 into a first arrangement based on the first delivery route prior to the first stop of the first delivery route. This may be done from data scanned or imaged from a label on the package by the imaging device 30 (e.g., a camera) of the user's handheld device, which can be communicated via a wired or wireless connection to the vehicle. The processors 20 may also be caused to determine a first arrangement of containers, which may be achieved by the tile floor system 50 via selective actuation of the rollers of respective tiles in a specific sequence, based on the first delivery route. Moreover, in accordance with the disclosed concept, the GNSS 26 may prioritize delivery routes based on where packages in the respective containers are to be delivered.

FIG. 4A shows a view of a delivery driver 100 holding the mobile device 200 and a package 110, and FIG. 4B shows an enlarged view of a portion of the package 110 of FIG. 4A. As will be discussed below, the vehicle 2, system 3 for the same, and associated method disclosed herein assist at least in part in allowing the delivery driver 100 to deliver the package 110 more easily. As a result, driving time may be maximized and idle time of the vehicle 2 may be minimized.

In one example, in a loading operation of the delivery vehicle, the delivery driver 100 may scan the package 110 with the camera 210. In turn, the delivery driver 100 may then simply place the package 110 into a nearest one of the containers 80-90 or may be provided with a predetermined one of the containers 80-90 by the tile floor system 50, in response to the delivery driver 100 scanning the package 110. See, for example, the container 81 in FIG. 2, which is containing the package 110. Subsequently, the tiles 51 then rearrange the containers 80-90 to place a next empty container for receiving a next package, which is advantageous in that loading is significantly simplified, as compared to prior art processes (not shown). Additionally, by scanning the package 110 with the camera 210 and placing the package 110 into the container 81, several important associations are made.

First, as shown in FIG. 4B, the package 110 may have a shipping label 112 which is configured to be scanned by the camera 210 of the mobile device 200. The shipping label 112 may include a machine-readable code (such as a barcode, QR code, etc.) 113 and an identifier in the form of a shipping number 118 and/or an address 116. When the camera 210 of the mobile device 200 scans the barcode 113, image data corresponding to the shipping number 114 and the address 116 may be extracted via character recognition software or other techniques on the mobile device 200, and may in turn communicated to the processors 20 of the vehicle 2 via the mobile application 212 of the mobile device 200. In other words, the camera 210 is configured to receive image data indicative of the identifiers 116 and/or 118, and the processors 20 are configured to associate the package 110 with the shipping number 118 and/or the address 116.

Second, when the delivery driver 100 places the package 110 into the container 81, the imaging device 30 (e.g., a camera) and/or the camera 210 may individually or together be configured to determine (e.g., automatically determine and associate) which container the package 110 is placed in. The processors 20 of the vehicle 2 may be configured to determine an association between the package 110 and the one of the containers 80-90 via position estimation. For example, one or more of the cameras 30, 210 may be configured to scan the delivery driver 100 (e.g., his limbs) and/or the container (e.g., an identifier code associated with a container having a known position (e.g., in association with a specific tile), and send data corresponding to the delivery driver 100 and/or container to the processors 20, in addition to sending data to the processors 20 corresponding to the packaging label 112. See, for example, label 80-1 of container 80 in FIG. 2. In this manner, the processors 20 can combine data corresponding to each of the containers 80-90 (e.g., identifications associated with the containers 80-90) with data corresponding to the container into which the package was placed, and determine with accuracy and association between the package and the container in which it is located.

Stated differently, image data from one or more of the cameras 30,210 corresponding to the package 110 is indicative of the package 110 being in the container 81. Accordingly, the associations between the package 110 and the container 81, as well as between the package 110 and the identifiers 116, 118, i.e., destination address, are all communicated to the processors 20. In turn, the processors 20 may be configured to communicate with the processor of the tile floor system 50 in order to allow the package 110, and a plurality of other packages which may be located in any of the other containers 80,82-90, to efficiently be dynamically arranged and made readily accessible to the driver 100 during delivery at respective stops.

Figure 5A:
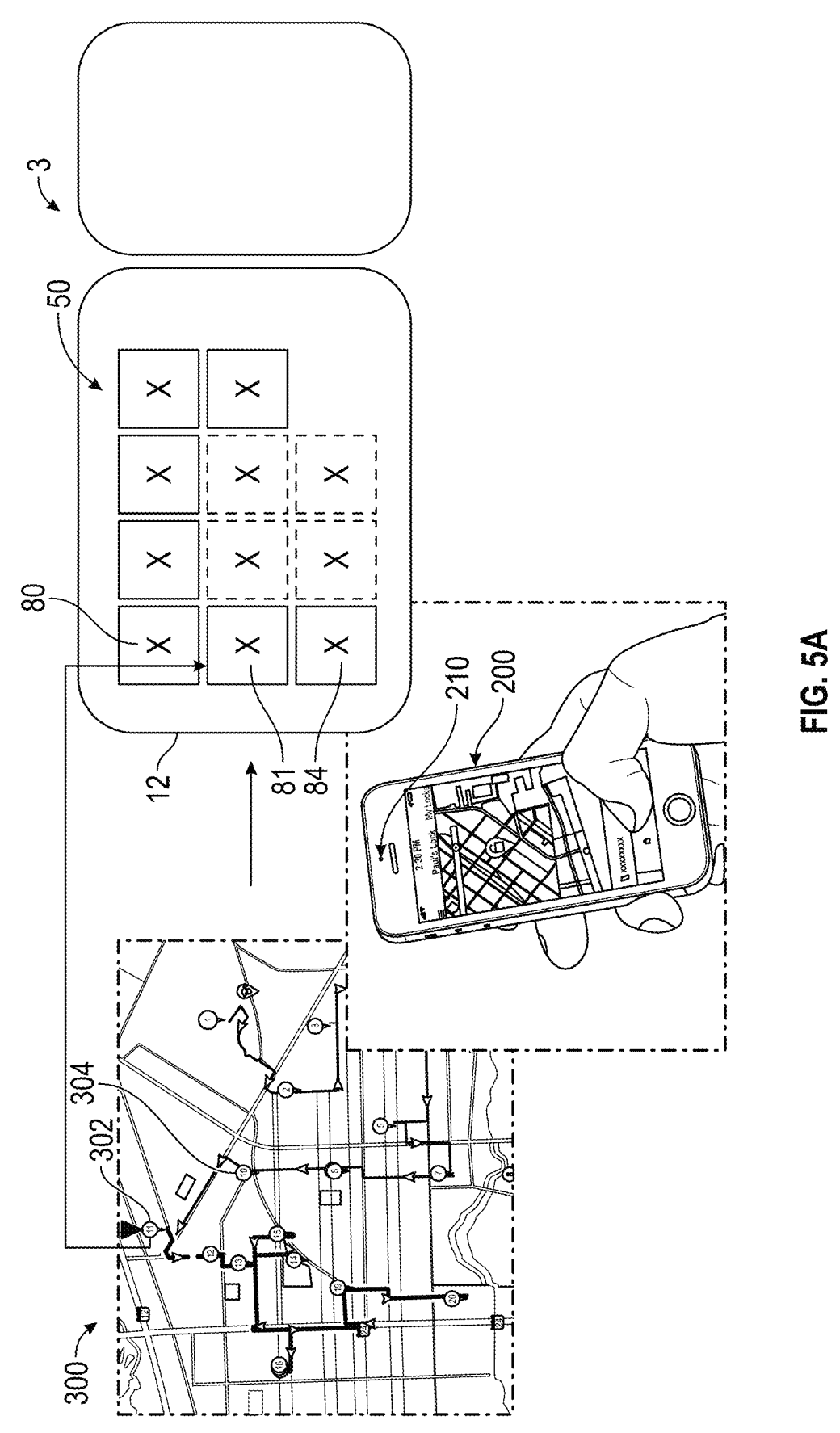
FIGS. 5A-5C show route plans, a mobile device, and a schematic of the vehicle and system for the same of FIG. 1, shown with first, second, and third arrangements of the tile floor system, respectively.

In accordance with the disclosed concept, the vehicle 2 and system 3 may advantageously assist with package delivery at least in part via preferred driving routes being provided to the delivery driver 100 and automatic rearrangement of the containers via the tile floor system 50 in order for ready-to-be-delivered packages to be presented at the rear access door 12 when the delivery driver 100 reaches a desired destination. More specifically, as stated above, the processors 20 may be configured to automatically determine a first delivery route that includes a first stop associated with the identifiers 116,118 for the package 110. This is distinct from prior art package delivery systems (not shown), wherein delivery routes are manually determined. See FIG. 5A, for example, which shows a first delivery route 300 including a first stop 302 associated with the package 110. Accordingly, before the vehicle 2 and the delivery driver 100 reach the first stop 302, the processors 20 are further configured to rearrange (e.g., re-position) the containers on the tile floor system 50 into a first arrangement (e.g., the arrangement depicted in FIG. 5A).

In other words, prior to the vehicle 2 arriving at the first stop 302, the package delivery system 3 rearranges the tile floor system 50 so that the container 81 is positioned adjacent to and is presented at the rear access door 12, thus minimizing searching and package fetching time of the delivery driver 100. Moreover, the system 3 is configured to know where the container 81 and associated package 110 are due to the associations made while the package 110 was loaded into the container 81. In this manner, when the driver 100 arrives at the first stop 302, the container 81 will be positioned near the access door 12 in order to allow the driver 100 to quickly and easily grab the package 110 and drop off at the destination. This is desirable as compared to prior art vehicles and systems (not shown) in that the delivery driver 100 will not have to search for the package 110 while he is delivering it. Rather, the delivery driver 100 can simply scan the package 110 at loading, place the package 110 into the container 81 (e.g., or any other of the containers 80,82-90 by virtue of the cameras 30,210 determining which container the package 110 is in), and be provided with the first delivery route 300 via the GNSS 26 of the vehicle 2.

In such a matter, the vehicle 2 and system 3 may handle on-demand deliveries in which case, upon completion of the package loading, the delivery address of each package can be sent to GNSS 26 for on-demand route plan creation.

Additionally, it will be appreciated that it generally does not matter which order packages are loaded into the containers 80-90 because the system 3 will re-orient the packages once the delivery routes are provided by the GNSS 26. That is, the delivery driver 100 may scan and place one or a plurality of packages into one of the containers 80-90, and then the tile floor system 50 will be caused to provide the delivery driver 100 with another of the containers 80-90 to continue to use for loading. This may be done responsive to signals being sent from the processors 20 to control the tile floor system 50. Moreover, the delivery routes may be determined dynamically in real-time because they are preferably not pre-planned. In other words, packages being delivered with the vehicle 2 and system 3 for the same address/location/stop are ordered at the time they are placed into the containers 80-90. The disclosed system 3 is thus highly automated, as compared to prior art package delivery systems (not shown).

Subsequently, after the delivery driver 100 has delivered the package 110 to the addressee at the first stop 302, the delivery driver 100 may get back in the vehicle 2 and proceed via a second delivery route as provided by the GNSS 26 of the vehicle 2. See FIG. 5B, for example, which shows a second delivery route 310. Accordingly, the memory 22 of the vehicle 2 may further include instructions that, when executed by the processors 20, cause the processors 20 to perform operations including generating a second delivery route 310 (e.g., a route from the first stop 302 to the second stop 304), determining a second arrangement (e.g., re-positioning) of the containers using the tile floor system 50 after the first stop 302, and rearranging one or more of the containers on the tile floor system 50 into a second arrangement based on the second delivery route 310. The processors

20 may also be configured to receive the second arrangement from the processor of the tile floor system 50. Accordingly, the containers 80-90 are configured to change positions via the tile floor system 50 automatically as the delivery route is changed.

Figure 5B:
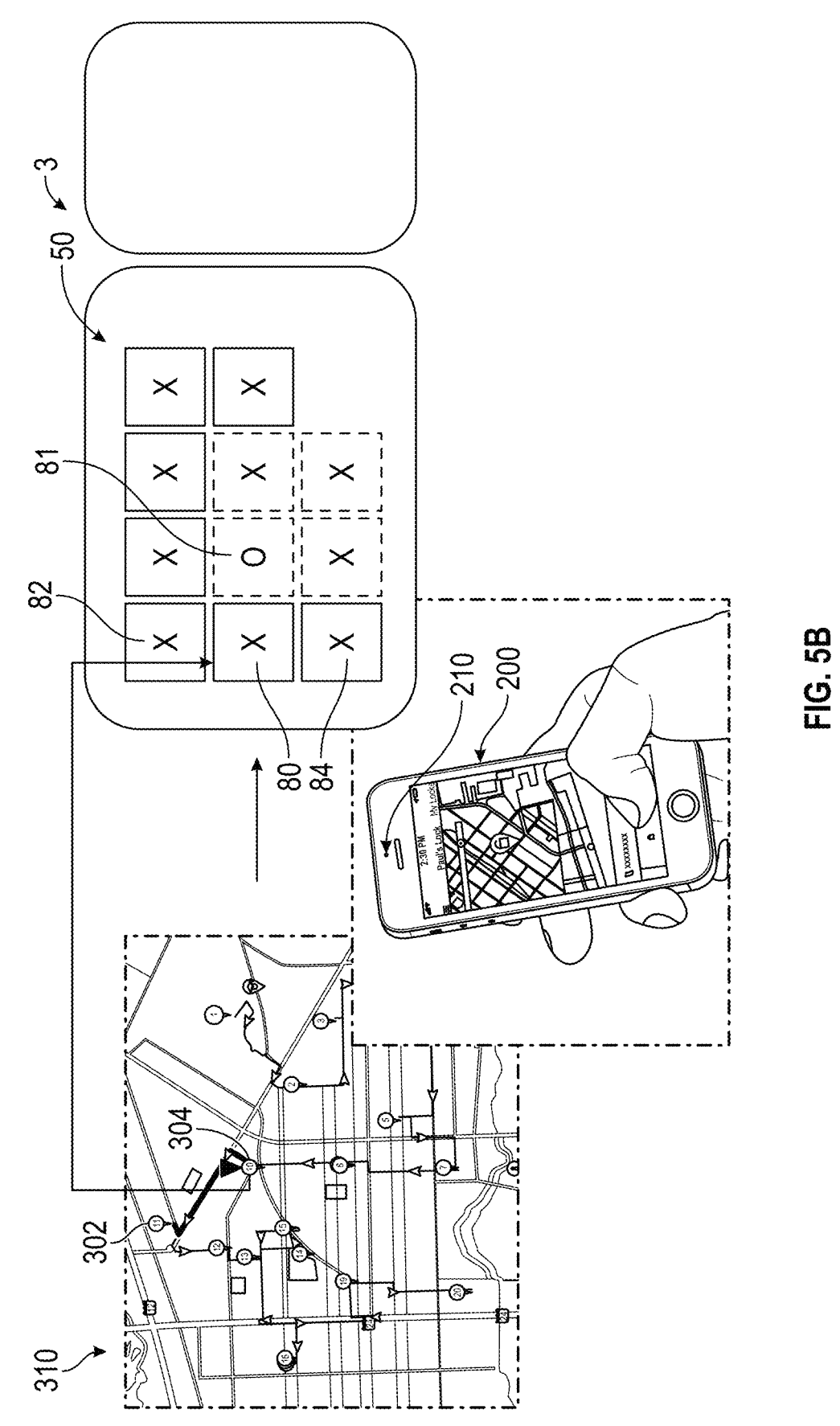

As shown in FIG. 5B, the containers have been re-configured (e.g., as compared to the position in FIG. 5A) after the first stop 302 to a second arrangement wherein the container 81 is in a middle of the arrangement. See, for example, the "O" in the container 81 corresponding to the fact that the package 110 has already been delivered. In other words, the container 81 is empty in the position depicted in FIG. 5B. Similarly, other of the containers have been moved by the tile floor system 50 such that the containers 82,84 are now all positioned immediately adjacent the rear access door 12.

Figure 5C:
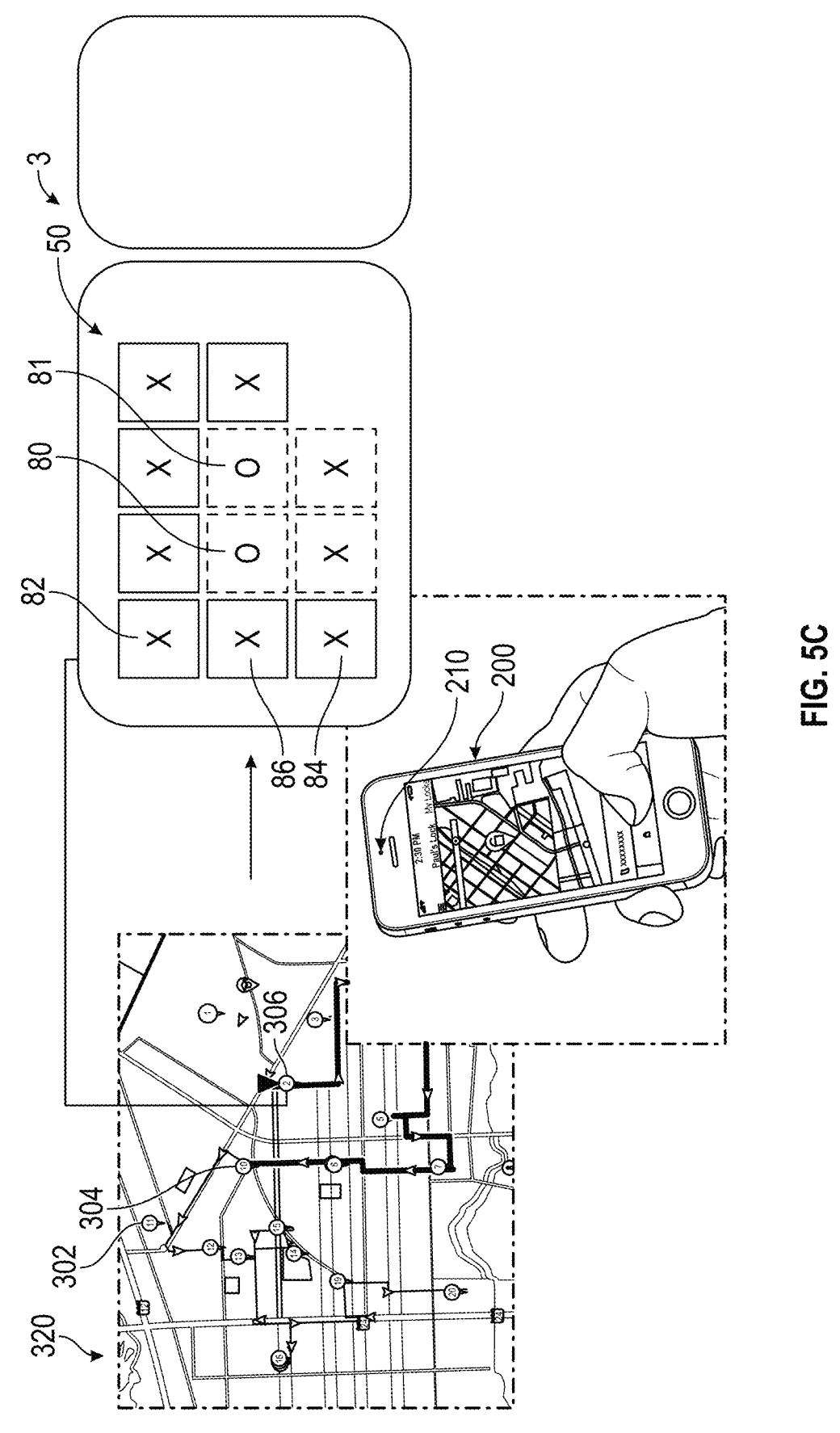

In the example of FIGS. 5B and 5C, the package in the container 80 has been delivered to the second stop 304. Accordingly, the memory 22 of the vehicle 2 may further include instructions that, when executed by the processors 20, cause the processors 20 to perform operations including rearranging the tiles 51 into a third arrangement (e.g., the arrangement depicted in FIG. 5C) prior to a third stop 306, wherein the third arrangement includes the containers 82,84, 86 being positioned at the rear access door 12 of the vehicle 2. It will be appreciated that packages in one of the containers 82,84,86 may be retrieved by the delivery driver 100 and delivered to a residence. Subsequently, the tile floor system 50 may re-arrange the tiles 51 such that any of the other containers are positioned proximate the rear access door 12.

Therefore, the disclosed vehicle 2 and system 3 for the same are provided such that the delivery driver 100 can simply scan any number of packages (e.g., the package 110), load the packages into the containers 80-90, and be provided with delivery routes (e.g., the delivery routes 300,310,320) determined by the GNSS 26 of the vehicle 2 based on either the Inventory Database 22-2 in the Memory 22 or the delivery addresses obtained during the loading process. Additionally, as the delivery driver 100 is scanning packages, he does not need to be concerned with which of the containers 80-90 he is placing the packages in, as the cameras 30,210 and identifications associated with the containers 80-90 can allows the processors 20 to make these associations. Furthermore, this may be done in an automated manner that is well tailored for small and medium businesses in urban and other settings. Moreover, if the delivery driver 100 detours and drives off one of the delivery routes 300,310,320 (e.g., for a lunch break, due to traffic, etc.), the GNSS 26 can recalculate and provide an updated delivery route to the delivery driver 100, and automatically re-configure the containers on the tile floor system 50 into a further arrangement. For example, at least a portion of the first delivery route 300 may be replaced with another delivery route to yield the second delivery route 310. The disclosed vehicle 2 and package delivery system 3 for the same are thus configured to convert location data for vehicle routing, wherein coordinates at each given location are fed into the mobile application 212, which may be a dynamic application for route planning.

Furthermore, the delivery routes 300,310,320 may be provided via the mobile device 200 of the delivery driver 100 and/or to the HMI 24 of the vehicle 2, to make the job of the delivery driver 100 as seamless as possible. In other words, the job of the delivery driver 100 substantially comprises scanning packages, driving to a recipient address based on delivery routes 300,310,320 provided via the GNSS 26, and delivering packages. As the delivery driver 100 is doing this, the tile floor system 50 is able to dynamically re-arranging the containers such that corresponding containers 80-90 containing the packages 110 move to positions so that all the delivery driver 100 has to do is open the rear access door 12, remove the package 110 designated for delivery at that stop, deliver it to the residence/recipient, and continue following driving routes provided by the GNSS 26. Additionally, although the disclosed concept is being described in association with the containers 80-90 being moved immediately adjacent the rear access door 12 for easier delivery, it will be appreciated that alternative arrangements are contemplated herein, such as where the tile floor system 50 moves the containers 80-90 immediately adjacent a side access door of the vehicle 2.

Accordingly, before the delivery driver 100 begins his work shift, he may not know how many packages are to be delivered. That is, there may be no pre-planning associated with usage of the vehicle 2 and system 3 for the same. However, the disclosed low barrier solution advantageously allows the delivery driver 100 to deliver the packages (e.g., the package 110) with greater ease than known systems and methods. Once the delivery driver 100 scans the packages, the processors 20 translate the shipping label 112 into the identifiers 116,118, which are used for route planning with the GNSS 26. Additionally, after the packages are scanned by the delivery driver 100, they may be placed in the containers 80-90, each of which has an identification associated therewith. There are many ways to identify and locate a container. In one method a unique number may be assigned to each of the eleven containers 80-90. A number may be printed on each container. Before loading the packages, the system 3 can run a preloading scan during which each empty container is moved within the field of view of the camera 40 for a photographic identification of the number so the system 3 knows which tile carries which container. With the establishment of the initial tile-container association, the system 3 can track the movement of a container and dynamically update the association with precision. In another method, prior to loading the containers, a default pattern is used for the eleven empty containers 80-90 to be placed on the tile system 3 initially. For instance, a default pattern may be such that the driver side, rearmost tile is free of the container. In this case each of the eleven containers may be assigned a unique number with a known association with the underlying tile. With the establishment of the initial tile-container association, the system 3 can track movement of a container and dynamically update the association with precision. As a result, the processors 20 of the vehicle 2 and the tile floor system 50 know which tiles 51 carry which container 80-90, which containers 80-90 contain which packages, and know which addresses those packages are to be delivered to. The system 3 thus makes the job of the delivery driver 100 significantly less cognitively difficult, and thus eliminates a lot of error, as compared to prior art systems (not shown).

Moreover, although the disclosed concept has been described in association with the system 3 being run locally on the vehicle 2, it will be appreciated that the system 3 may also be run via the network 202 (FIG. 1). That is, route planners could be configured to be run through the network 202 (e.g., sending addresses to the network 202, computing delivery routes with the network 202 based on traffic patterns, delivery time requirements (e.g., groceries may need to be delivered faster), time of day, mileage driven, and the like), with such information being sent from the network 202 back to the processors 20 of the vehicle 2.

Figure 6:
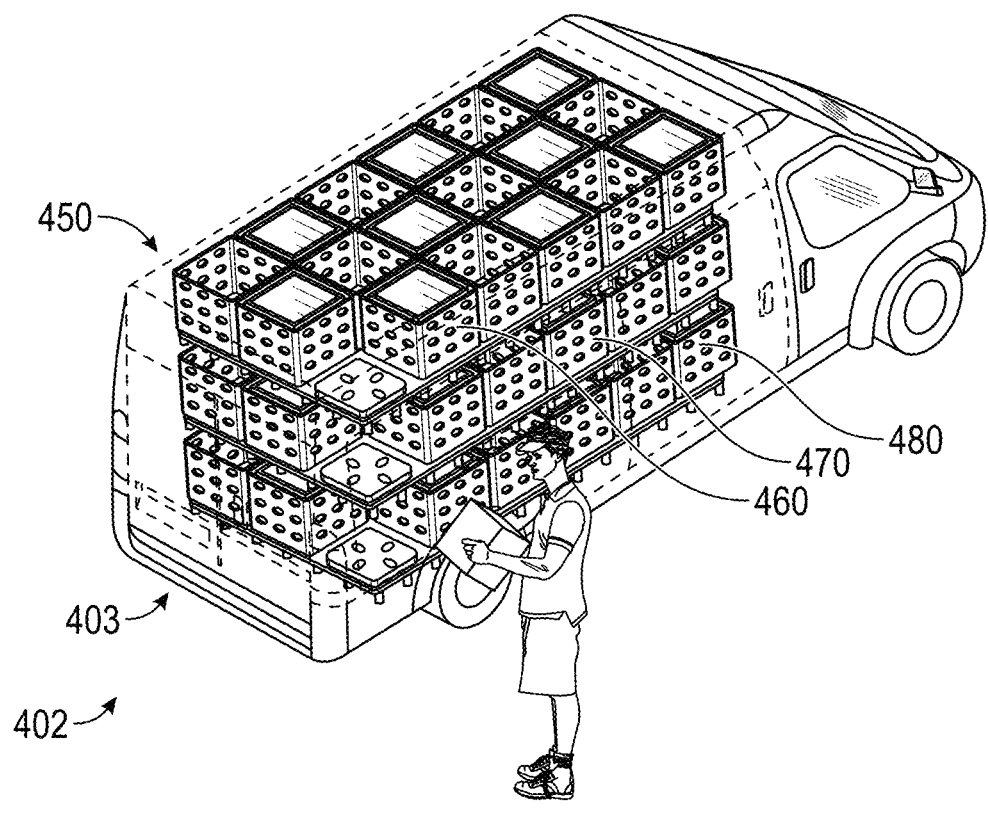
FIG. 6 shows another delivery driver standing beside another vehicle, in accordance with another non-limiting embodiment of the disclosed concept.

FIG. 6 shows another vehicle 402 and package delivery system 403 for the same, in accordance with another non-limiting embodiment of the disclosed concept. The vehicle 402 and package delivery system 403 are configured similar to the vehicle 2 and system 3 for the same described above, and like numbers represent like features. As shown, the tile floor system 450 of the vehicle 402 is comprised of a plurality of levels 460,470,480, wherein each of the levels 460,470,480 has a plurality of tiles (not labeled in FIG. 6). In this manner, the vehicle 402 may be configured to allow for delivery of packages in the same manner (e.g., scanning packages, placing packages into containers on the levels 460,470,480 of the tile floor system 450, generating delivery routes, replacing delivery routes, re-arranging the tile floor system, etc.) as the vehicle 2, except that a larger volume of packages may be delivered with the vehicle 402, via the multi-level tile floor system 450.

In one example, as shown in FIG. 7, a method 500 of delivering packages includes a first step 502 of determining an identifier 116,118 for a package 110, a second step 504 of receiving, by one or more processors 20, image data associated with the package 110 from an imaging device 30,210, a third step 506 of determining an association of the package 110 with a first container 81 based on the image data, a fourth step 508 of determining a first delivery route 300 that includes a first stop 302 associated with the identifier 116,118 for the package 110, and a fifth step 510 of rearranging the containers using a tile floor system 50 into a first arrangement based on the first delivery route 310 prior to the first stop 302 of the first delivery route 300. The method 500 may also include steps of generating a second delivery route 310, replacing at least a portion of the first delivery route 300, and rearranging one or more of the containers using the tile floor system 50 into a second arrangement based on the second delivery route 310. The method may further include the step of rearranging the tiles 51 into a third arrangement prior to the first stop, wherein the third arrangement includes the first container being positioned at the access door 12 of the vehicle 2.

Figure 8:
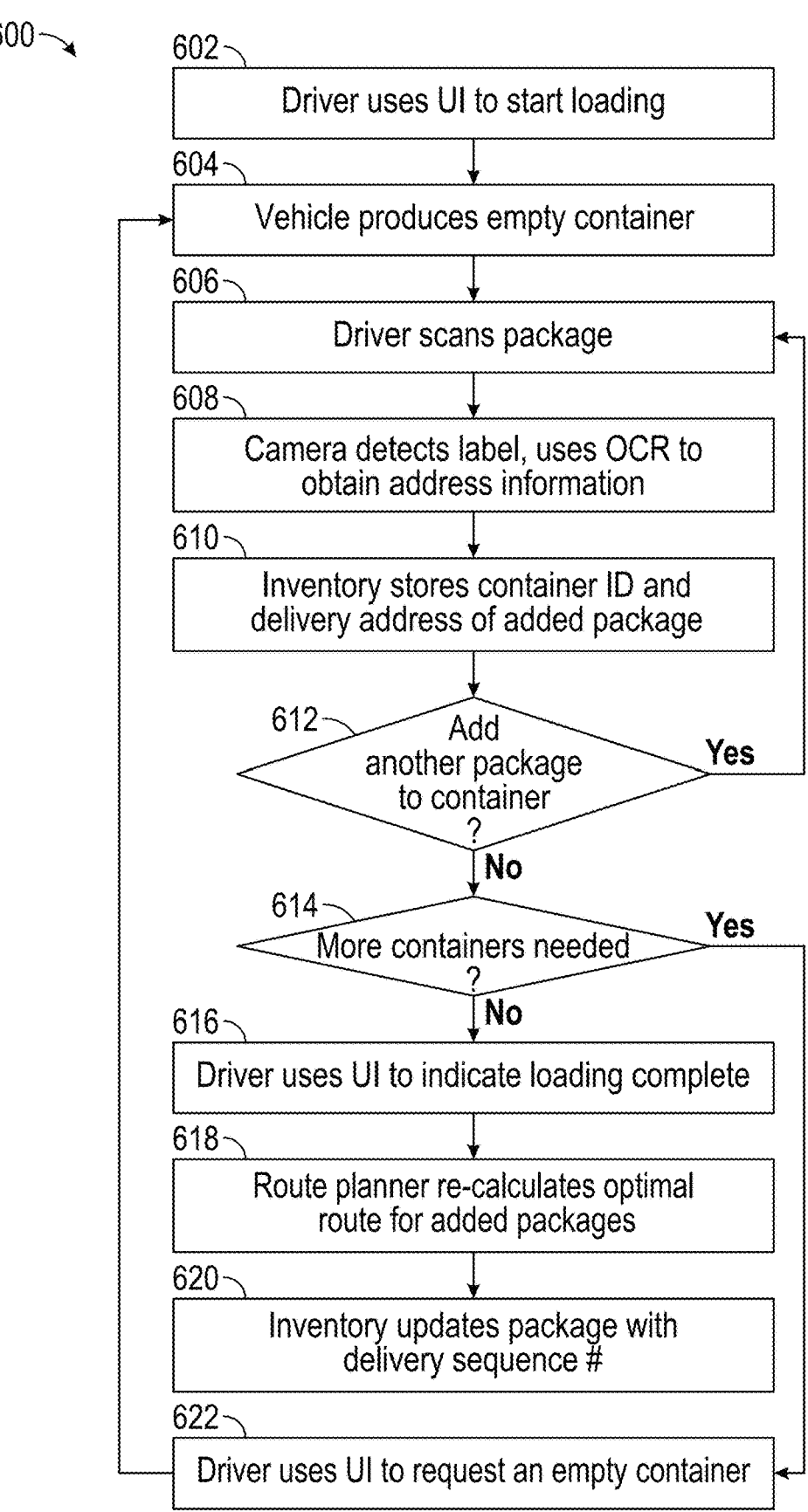
FIG. 8 is an example method in which the disclosed concept may be employed.

Additionally, FIG. 8 shows a method 600 in which the disclosed concept may be employed. In one example, the method 600 includes a first step 602 of having the driver use the user interface controller 22-6 to start loading, a second step 604 of producing an empty container, a third step 606 of scanning a package, a fourth step 608 of detecting a label, and using OCR (Optical Character Recognition) to obtain address information, a fifth step 610 of storing a container delivery address of the added package, and a sixth step 612 of asking the driver if another package is to be added. If the answer is yes, the third step 606 is repeated. If the answer is no, a seventh step 614 includes asking if more containers are needed. If the answer is no, the method 600 includes an eighth step 616 of employing the user interface controller 22-6 to indicate that loading is complete, a ninth step 618 of employing the route planner 22-1 to re-calculate an optimal route for added packages, and a tenth step 620 of updating the inventory database 22-2 with a delivery sequence number. If however, the answer to the seventh step 614 is yes, the method 600 includes an eleventh step 622 of requesting an empty container with the user interface controller 22-6, and then the method repeats the aforementioned steps starting with the second step 604 of producing an empty container. It will be appreciated from the method 600 that packages can be loaded quickly and not necessarily into optimal spots.

Figure 9A:
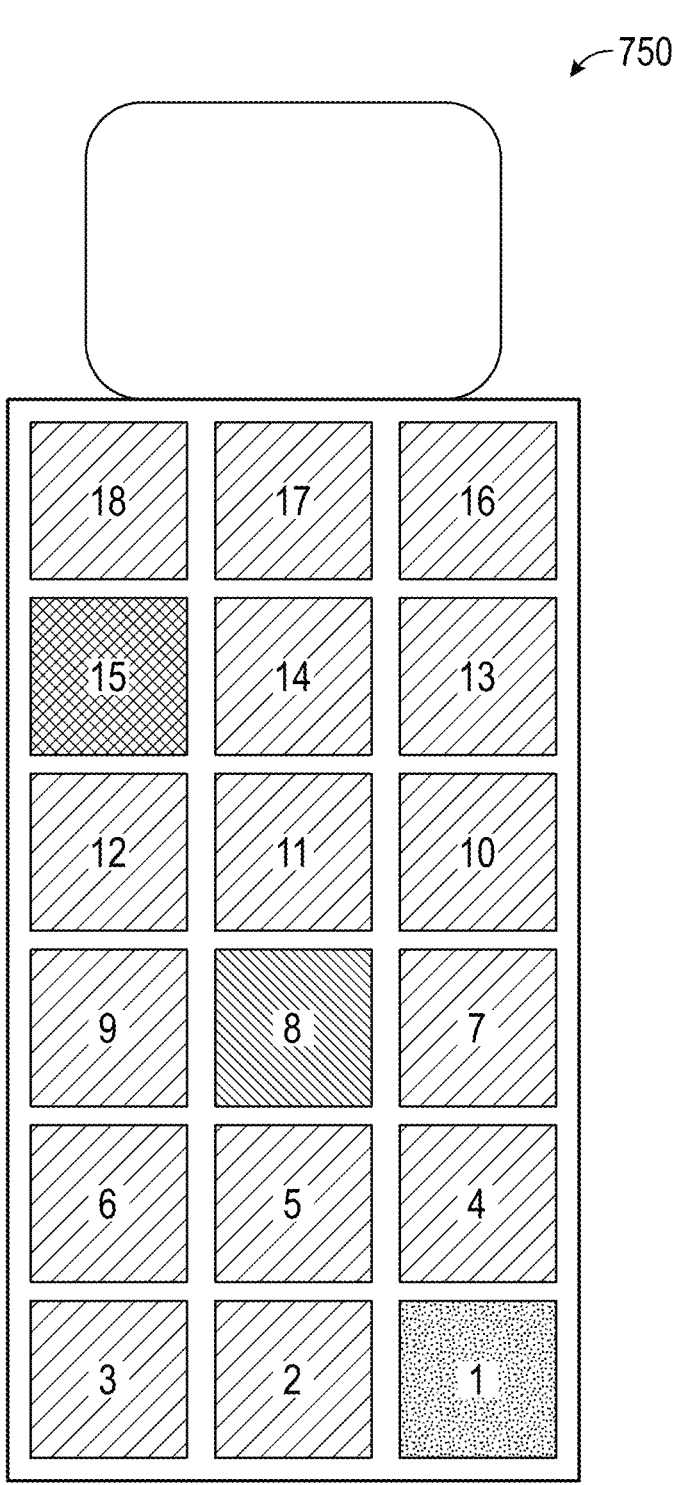
FIG. 9A shows another tile floor system in which the disclosed concept may be employed.

FIG. 9A shows another tile floor system 750 in which the disclosed concept may be employed. As stated above, an objective of the disclosed concept is to re-arrange individual containers so that the one with the package for the upcoming delivery is moved to the target (i.e., easy access) position before the vehicle 2 arrives at the delivery stop. In the example of FIG. 9A, the container on location "15" will need to move to a target location "1". In order to do this, the system knows the container in which the delivery packages reside because of the association that was stored during loading. As such, a graph-based algorithm determines an optimal sequence of movements in order to move the requested container (e.g., the container on location "15") to the target location "1", which may be at a rear of the vehicle. The tile floor system 750 does this by employing location "8", which does not, in the depiction of FIG. 9A, have a container located on it. Location "8" may thus be considered to be an empty location.

Figure 9B:
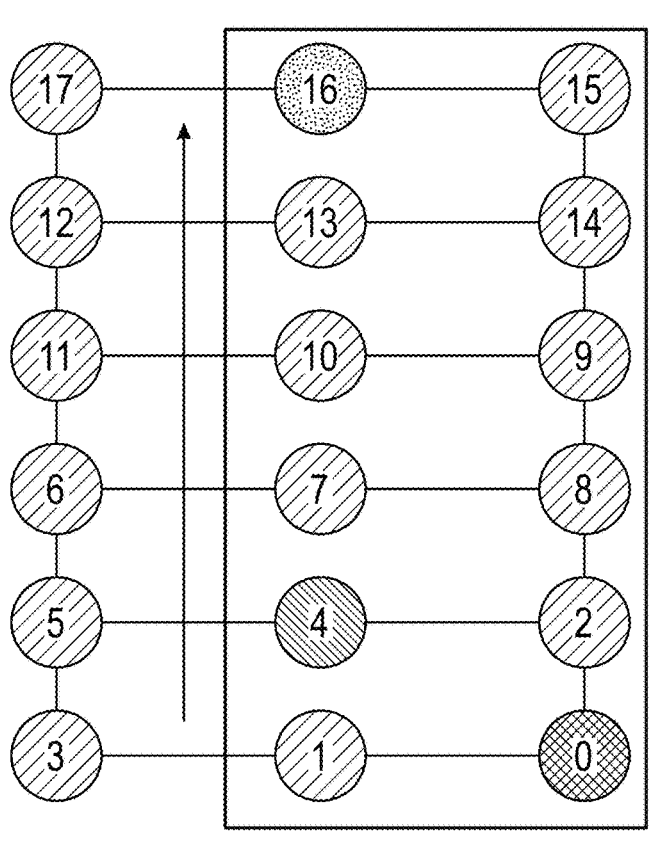
FIG. 9B shows moving containers of the tile floor system of FIG. 9A in a conveyor-like fashion.
Figure 9C:
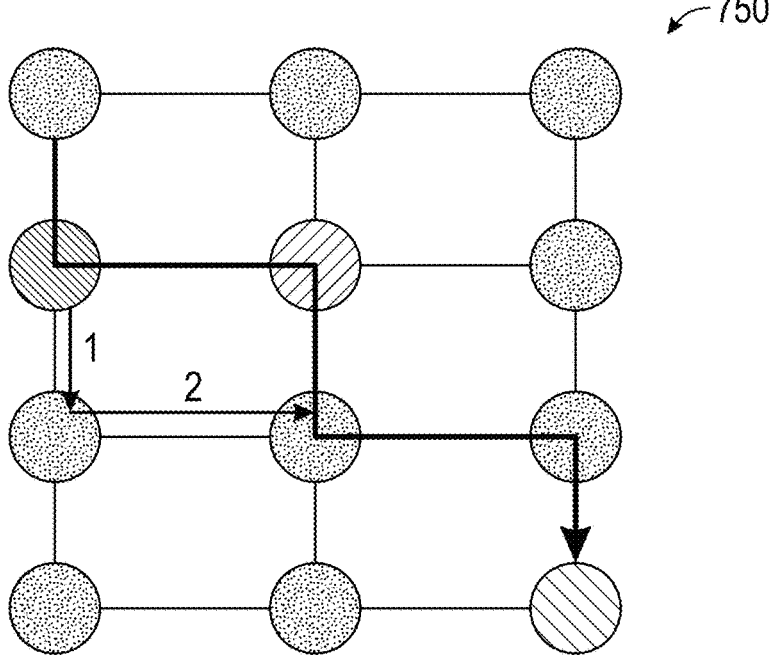
FIG. 9C shows determining a minimal cost path using Djikstra methods.

In accordance with the disclosed concept, the algorithm should aim to minimize the time it takes to move a container to the target location and with respect to the starting location of the empty tile. FIGS. 9B and 9C show different approaches in which containers may be moved, in accordance with the disclosed concept. For example, FIG. 9B shows moving the containers in a conveyor-like fashion to rotate the desired container to the correct location. FIG. 9C shows determining a minimal cost path using Djikstra methods from the starting location of the container to the target location, and then moving the empty tile to accomplish that path.

Accordingly, it will be appreciated that the containers may be rearranged a plurality of different times via algorithms employed by the processor(s) 20 of the vehicle 2 and the tile floor system 50 prior to any of the stops 302,304,306. More specifically, movement of the containers 80-90 may be optimized such that the time for any one of the containers 80-90 to move from a start position (e.g., a position in the back of the interior of the vehicle 2 close to the driver's seat) to a target position (e.g., a position toward the rear access door 12) is minimized. Additionally, the method may also include another step of determining a second arrangement of containers using the tile floor system 50 after a second stop 304.

Further, the vehicles 2, 402 may have an autonomous driving system that is configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

The processors 20 of the vehicles 2,402 may be commercially available general-purpose processors, such as a processor from the Intel® or ARM® architecture families. The memories 22 of the vehicles 2,402 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle for package delivery, comprising:
one or more processors;
a tile floor system connected to the one or more processors, the tile floor system comprising a plurality of tiles with actuators that individually move containers thereon, and in a first arrangement a first tile is associated with a first container;
at least one imaging device; and
a memory comprising instructions that, when executed by the one or more processors, cause the one or more processors to perform operations comprising:
determine an identifier for a package,
receive first image data associated with the package from the imaging device,
determine a first association of the package with the first container based on the first image data,
determine a first delivery route that includes a first stop associated with the identifier for the package, and
rearrange the containers by the tile floor system into a second arrangement based on the first delivery route prior to the first stop of the first delivery route.

2. The vehicle according to claim 1, wherein the first association between the package and the first container is based on the identifier.

3. The vehicle according to claim 2, wherein the identifier is a shipping number.

4. The vehicle according to claim 2, wherein the identifier is an address.

5. The vehicle according to claim 2, wherein the at least one imaging device is configured to receive second image data, the second image data indicative of the identifier.

6. The vehicle according to claim 5, wherein the second image data includes a machine-readable code.

7. The vehicle according to claim 5, wherein the at least one imaging device includes a mobile device.

8. The vehicle according to claim 2, wherein the first image data of the package is indicative of the package being in the first container.

9. The vehicle according to claim 8, wherein the memory further comprises instructions that, when executed by the one or more processors, cause the one or more processors to perform operations comprising generate a second delivery route, replace at least a portion of the first delivery route with the second delivery route, and rearrange one or more of the containers by the tile floor system into a third arrangement based on the second delivery route.

10. The vehicle according to claim 9, wherein the memory further comprises instructions that, when executed by the one or more processors, cause the one or more processors to perform the operation comprising rearrange the containers into a fourth arrangement prior to a next stop, and wherein the fourth arrangement includes the first container being positioned at an access door of the vehicle.

11. A system, comprising:
one or more processors; and
a memory comprising instructions that, when executed by the one or more processors, cause the one or more processors to perform operations comprising:
determine an identifier for a package,
receive first image data associated with the package,
determine a first association of the package with a first container based on the first image data,
determine a first delivery route that includes a first stop associated with the identifier for the package, and
determine a first arrangement of a tile floor system comprising a tile associated with the package based on the first delivery route.

12. The system according to claim 11, wherein the memory further comprises instructions that, when executed by the one or more processors, cause the one or more processors to perform the operation comprising determine a second arrangement of the tile floor system after a second stop.

13. The system according to claim 12, wherein the memory further comprises instructions that, when executed by the one or more processors, cause the one or more processors to perform the operation comprising receive the second arrangement from the tile floor system.

14. The system according to claim 12, wherein the memory further comprises instructions that, when executed by the one or more processors, cause the one or more processors to perform the operation comprising re-configure the tile floor system after the second stop.

15. The system according to claim 12, wherein the first association between the package and the first container is based on the identifier, and wherein the memory further comprises instructions that, when executed by the one or more processors, cause the one or more processors to perform operations including generate a second delivery route, replace at least a portion of the first delivery route, and rearrange one or more of the tiles of the tile floor system into a third arrangement based on the second delivery route.

16. A method, comprising:
determining an identifier for a package;

receiving, by one or more processors, image data associ-
ated with the package from an imaging device;

determining an association of the package with a first
container based on the image data;

determining a first delivery route that includes a first stop
associated with the identifier for the package; and rearranging tiles of a tile floor system into a first arrange-
ment based on the first delivery route prior to the first
stop of the first delivery route.

17. The method according to claim 16, wherein the
association between the package and the first container is
based on the identifier.

18. The method according to claim 17, further comprising
generating a second delivery route, replacing at least a
portion of the first delivery route, and rearranging one or
more of the tiles of the tile floor system into a second
arrangement based on the second delivery route.

19. The method according to claim 18, further comprising
rearranging the tiles into a third arrangement prior to the first
stop, wherein the third arrangement includes the first con-
tainer being positioned at an access door of a vehicle.

20. The method according to claim 17, further comprising
determining a second arrangement of the tile floor system
after a second stop.

* * * * *